US011729457B2

(12) United States Patent
Reimann et al.

(10) Patent No.: US 11,729,457 B2
(45) Date of Patent: Aug. 15, 2023

(54) CONTEXT-BASED USER MUSIC MENU SYSTEMS AND METHODS

(71) Applicant: Sonos, Inc, Santa Barbara, CA (US)

(72) Inventors: Robert Reimann, Santa Barbara, CA (US); Abhishek Kumar, Santa Barbara, CA (US); Paul Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/599,073

(22) Filed: Oct. 10, 2019

(65) Prior Publication Data

US 2020/0045366 A1 Feb. 6, 2020

Related U.S. Application Data

(63) Continuation of application No. 13/424,066, filed on Mar. 19, 2012, now Pat. No. 10,469,897.

(51) Int. Cl.
*H04N 21/439* (2011.01)
*H04N 21/436* (2011.01)
(Continued)

(52) U.S. Cl.
CPC ..... *H04N 21/43615* (2013.01); *G06F 16/735* (2019.01); *H04L 12/66* (2013.01); *H04N 21/439* (2013.01); *H04N 21/8113* (2013.01)

(58) Field of Classification Search
CPC ........... H04N 21/43615; H04N 21/439; H04N 21/8113; H04L 12/66; G06F 16/735; G06F 3/0482
(Continued)

(56) References Cited

U.S. PATENT DOCUMENTS 5,276,797 A * 1/1994 Bateman ............... G06F 3/0482
345/157
5,440,644 A 8/1995 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

Advisory Action dated Aug. 9, 2016, issued in connection with U.S. Appl. No. 13/424,066, filed Mar. 19, 2012, 18 pages.
(Continued)

*Primary Examiner* — Dino Kujundzic
*Assistant Examiner* — Jianmei F Duckworth
(74) *Attorney, Agent, or Firm* — Akerman LLP

(57) ABSTRACT

Systems, methods, apparatus, and articles of manufacture to provide content to a playback network are disclosed. An example method includes displaying an indicator of multimedia content to a user via a graphical user interface. The example method includes enabling a multiselect state to allow the user to select multiple items from a browseable list of indicators associated with multimedia content. The example method includes providing a context-sensitive menu including a plurality of options associated with playback of selected items based on enablement of the multiselect state. The example method includes applying an option to each of the selected items based on user selection. The example method includes passing information regarding the multimedia content to a playback system including one or more multimedia playback devices in response to user selection of the option.

20 Claims, 12 Drawing Sheets

(51) Int. Cl.
*H04L 12/66* (2006.01)
*H04N 21/81* (2011.01)
*G06F 16/735* (2019.01)

(58) Field of Classification Search
USPC .......................................................... 715/716
See application file for complete search history.

(56) References Cited

U.S. PATENT DOCUMENTS

| | | | |
|---|---|---|---|
| 5,664,133 | A | 9/1997 | Malamud et al. |
| 5,751,672 | A * | 5/1998 | Yankowski .......... G11B 27/002 |
| | | | 709/238 |
| 5,761,320 | A | 6/1998 | Farinelli et al. |
| 5,923,902 | A | 7/1999 | Inagaki |
| 6,032,202 | A | 2/2000 | Lea et al. |
| 6,248,946 | B1 | 6/2001 | Dwek |
| 6,256,554 | B1 | 7/2001 | DiLorenzo |
| 6,404,811 | B1 | 6/2002 | Cvetko et al. |
| 6,456,304 | B1 | 9/2002 | Angiulo et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,818,672 | B2 | 10/2010 | McCormack et al. |
| 7,853,341 | B2 | 12/2010 | McCarty et al. |
| 7,920,824 | B2 | 4/2011 | Janik et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,050,652 | B2 | 11/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0149813 | A1 * | 7/2006 | Janik ........................ H04L 67/04 |
| | | | 709/203 |
| 2007/0142944 | A1 | 6/2007 | Goldberg et al. |
| 2007/0157097 | A1 | 7/2007 | Peters |
| 2008/0320139 | A1 | 12/2008 | Fukuda et al. |
| 2009/0249210 | A1 | 10/2009 | Sheldon et al. |
| 2009/0307741 | A1 | 12/2009 | Casagrande |
| 2011/0264732 | A1 | 10/2011 | Robbin et al. |
| 2012/0059910 | A1 | 3/2012 | Cassidy |
| 2012/0079126 | A1 | 3/2012 | Evans et al. |
| 2012/0210205 | A1 * | 8/2012 | Sherwood ............. G06F 40/143 |
| | | | 715/234 |
| 2012/0249853 | A1 | 10/2012 | Krolczyk et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 2, 2016, issued in connection with U.S. Appl. No. 13/424,066, filed Mar. 19, 2012, 25 pages.
Final Office Action dated Jun. 5, 2017, issued in connection with U.S. Appl. No. 13/424,066, filed Mar. 19, 2012, 26 pages.
Final Office Action dated Aug. 8, 2018, issued in connection with U.S. Appl. No. 13/424,066, filed Mar. 19, 2012, 25 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 10, 2017, issued in connection with U.S. Appl. No. 13/424,066, filed Mar. 19, 2012, 20 pages.
Non-Final Office Action dated Oct. 14, 2015, issued in connection with U.S. Appl. No. 13/424,066, filed Mar. 19, 2012, 22 pages.
Non-Final Office Action dated Dec. 27, 2017, issued in connection with U.S. Appl. No. 13/424,066, filed Mar. 19, 2012, 26 pages.
Notice of Allowance dated Jul. 18, 2019, issued in connection with U.S. Appl. No. 13/424,066, filed Mar. 19, 2012, 16 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

CONTEXT-BASED USER MUSIC MENU SYSTEMS AND METHODS

CROSS-REFERENCE TO RELATED APPLICATIONS

This application is a continuation of U.S. application Ser. No. 13/424,066, filed on Mar. 19, 2012, and currently pending. The entire contents of U.S. application Ser. No. 13/424,066 are incorporated herein by reference.

FIELD OF THE DISCLOSURE

The disclosure is related to consumer electronics and, more particularly, to providing music for selection and playback via one or more devices on a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
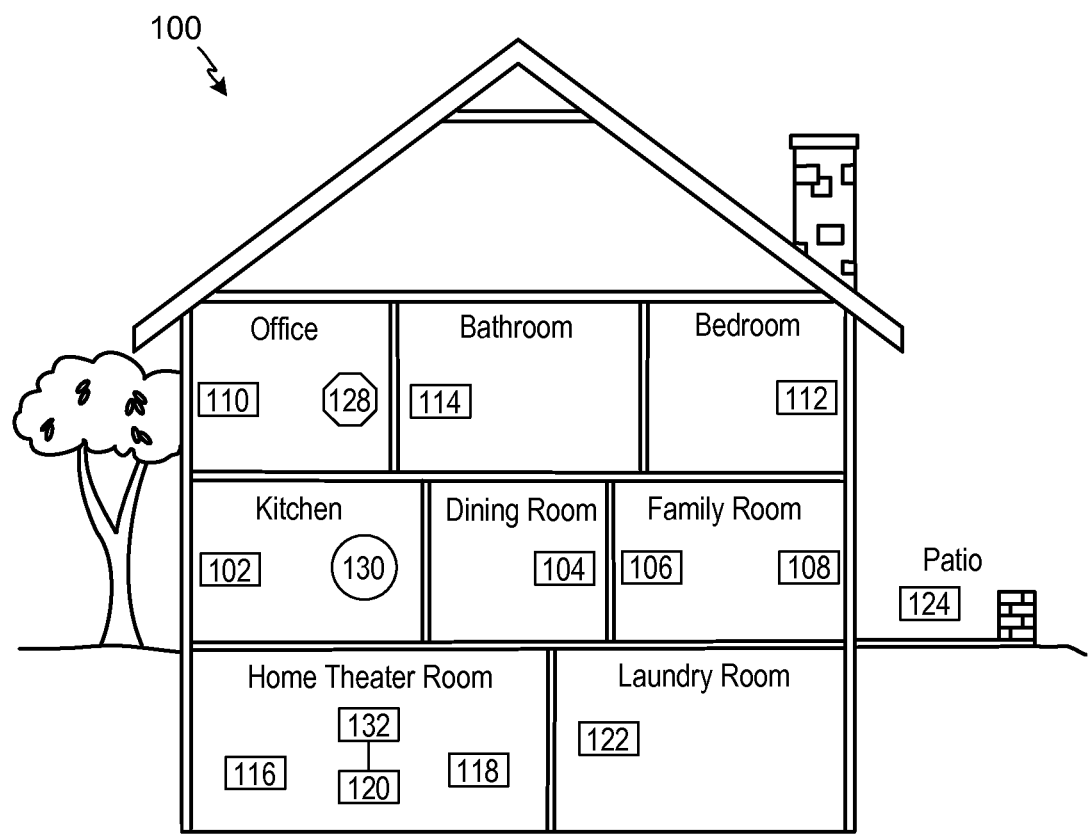
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Certain embodiments disclosed herein enable the selection of particular audio sources or tracks such as, for example, specific songs, playlists, artists, albums and/or genres. Certain embodiments provide multi-selection of a browseable item (e.g., provide an interface which allows both click to navigate into a container in a list of containers and click to multiselect those containers, without use of a tree view or similar "open/close" widget). Using multiselection, a list navigation paradigm can be maintained. A user interface allows a music listener and/or other user to select an audio source, track, volume, and so on for one or more connected devices. Certain embodiments allow selection of multiple items together (e.g., multi-select) to save a user time, effort, and so on while allowing the user to apply one or more settings to multiple items. Certain embodiments provide a context menu for one or more selected items based on a mouse click, cursor hover, and so on.

Wired or wireless networks can be used to connect one or more multimedia playback devices for a home or other location playback network (e.g., a home music system). Music and/or other multimedia content can be shared among devices and/or groups of devices (also referred to herein as zones) associated with a playback network.

Certain embodiments facilitate streaming or otherwise providing music from a music-playing application (e.g., browser-based application, native music player, other multimedia application, and so on) to a multimedia content playback (e.g., Sonos®) system. Certain embodiments provide simple, easy-to-use and secure systems and methods for multimedia content playback across a plurality of systems and locations. Certain embodiments facilitate integration between content partners and a playback system as well as supporting maintenance of such content and system.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Certain embodiments provide a method to provide content to a playback network. The example method includes displaying an indicator of multimedia content to a user via a graphical user interface. The graphical user interface is to facilitate arrangement and selection of the multimedia content by the user. The example method includes enabling a multiselect state to allow the user to select multiple items from a browseable list of indicators associated with multimedia content. The example method includes providing a context-sensitive menu for user selection via the graphical user interface, the context-sensitive menu including a plurality of options associated with playback of selected items based on enablement of the multiselect state. The example method includes applying an option to each of the selected items based on user selection. The example method includes passing information regarding the multimedia content to a playback system including one or more multimedia playback devices in response to user selection of the option. The example method includes facilitating play of the multimedia content via a playback network associated with the playback system.

Certain embodiments provide a computer readable storage medium including instructions for execution by a processor. The instructions, when executed, cause the processor to implement a method to provide content to a playback network. The example method includes displaying an indicator of multimedia content to a user via a graphical user interface. The graphical user interface is to facilitate arrangement and selection of the multimedia content by the user. The example method includes enabling a multiselect state to allow the user to select multiple items from a browseable list of indicators associated with multimedia content. The multiselect state is to allow the user to both navigate into a container and select a plurality of containers in a list. The example method includes providing a context-sensitive menu for user selection via the graphical user interface, the context-sensitive menu including a plurality of options associated with playback of selected items based on enablement of the multiselect state. The example method includes applying an option to each of the selected items based on user selection. The example method includes passing information regarding the multimedia content to a playback system including one or more multimedia playback devices in response to user selection of the option. The example method includes facilitating play of the multimedia content via a playback network associated with the playback system.

Certain embodiments provide a multimedia playback device including a wireless communication interface to communicate with a playback network and a multimedia content source and a processor. The example processor is to display an indicator of multimedia content to a user via a graphical user interface. The graphical user interface is to facilitate arrangement and selection of the multimedia content by the user. The example processor is to enable a multiselect state to allow the user to select multiple items from a browseable list of indicators associated with multimedia content. The multiselect state is to allow the user to navigate into a container and to select a plurality of containers in a list of the multimedia content. The example processor is to provide a context-sensitive menu for user selection via the graphical user interface, the context-sensitive menu including a plurality of options associated with playback of selected items based on enablement of the multiselect state. The example processor is to apply an option to each of the selected items based on user selection. The example processor is to pass information regarding the multimedia content to a playback system including one or more multimedia playback devices in response to user selection of the option. The example processor is to facilitate play of the multimedia content via a playback network associated with the playback system.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. While multiple controllers can be used simultaneously in the system configuration 100 such that when a change is made using one controller, all controllers are updated to have the latest state, only one controller 130 is shown for purposes of illustration. The system configuration 100 illustrates an example whole house audio system, though it is understood that the technology described herein is not limited to its particular place of application or to an expansive system like a whole house audio system 100 of FIG. 1. For example, playback can be controlled from a remote location. Playback can be controlled to a remote location (e.g., a remote zone player at an office is connected to a home playback system), for example.

Figure 2A:
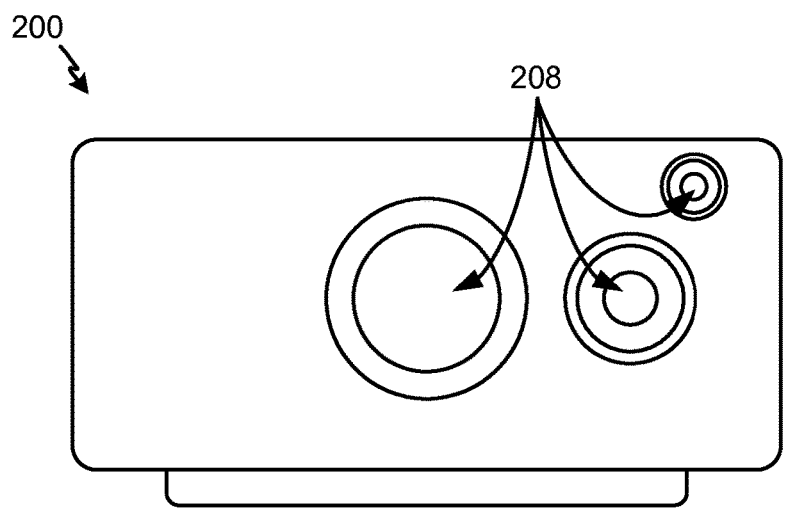
FIG. 2A shows an illustration of an example zone player having a built-in amplifier and speakers.
Figure 2B:
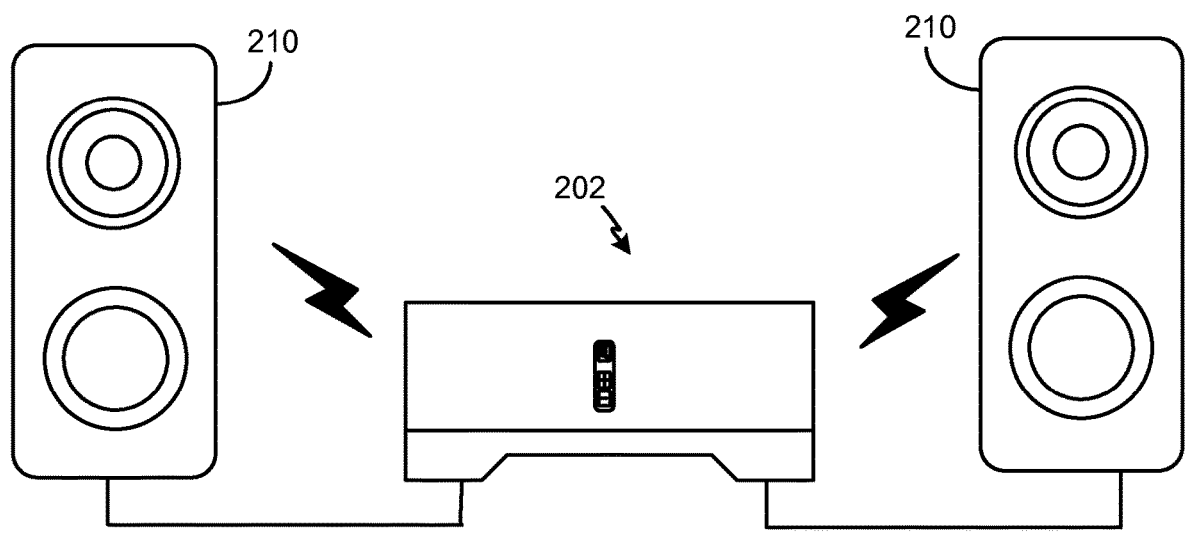
FIG. 2B shows an illustration of an example zone player having a built-in amplifier and connected to external speakers.
Figure 2C:
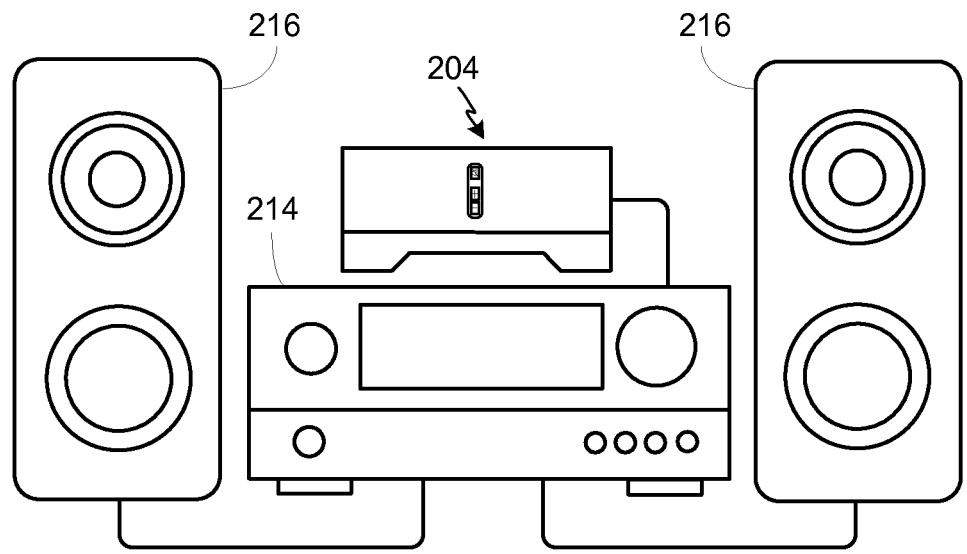
FIG. 2C shows an illustration of an example zone player connected to an AN receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer). In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "Sonos® S5," "Sonos PLAY:5," "Sonos PLAY:3," "ZonePlayer 120," and "Zone-Player 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
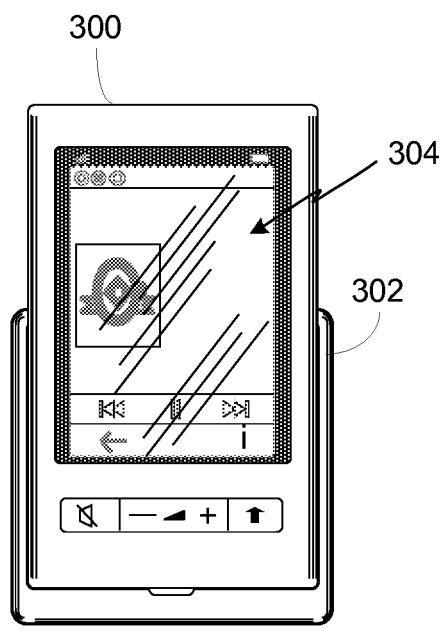
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Audio content can be accessed via cloud-based storage, for example. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
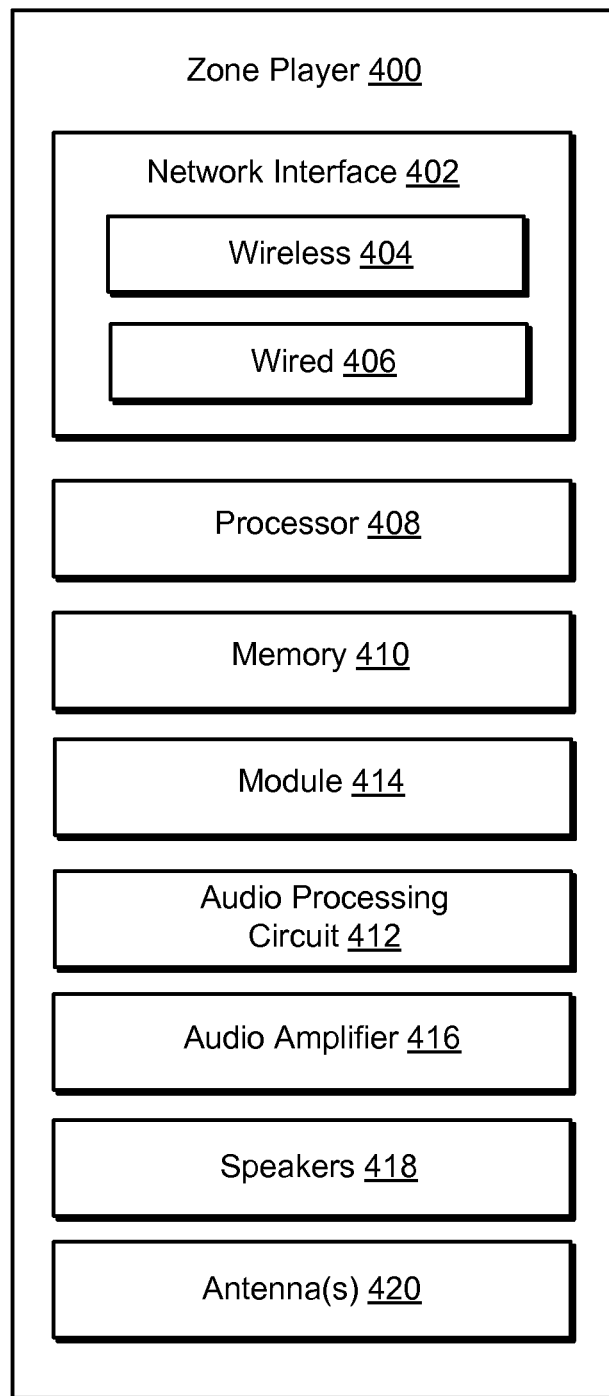
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use. The zone player 400 could be integrated into a television, for example.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® PLAY:5, which is manufactured by Sonos, Inc. of Santa Barbara, Calif. The PLAY:5 is an example zone player with a built-in amplifier and speakers. In particular, the PLAY:5 is a five-driver speaker system that includes two tweeters, two mid-range drivers, and one subwoofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® PLAY:5. While the PLAY:5 is an example of a zone player with speakers, it is understood that a zone player with speakers is not limited to one with a certain number of speakers (e.g., five speakers as in the PLAY:5), but rather can contain one or more speakers. The zone player, such as a PLAY:5, can have a headphone output and/or other output, for example. Further, a zone player can be part of another device, which might even serve a purpose different than audio (e.g., a lamp).

IV. Example Controller

Figure 5:
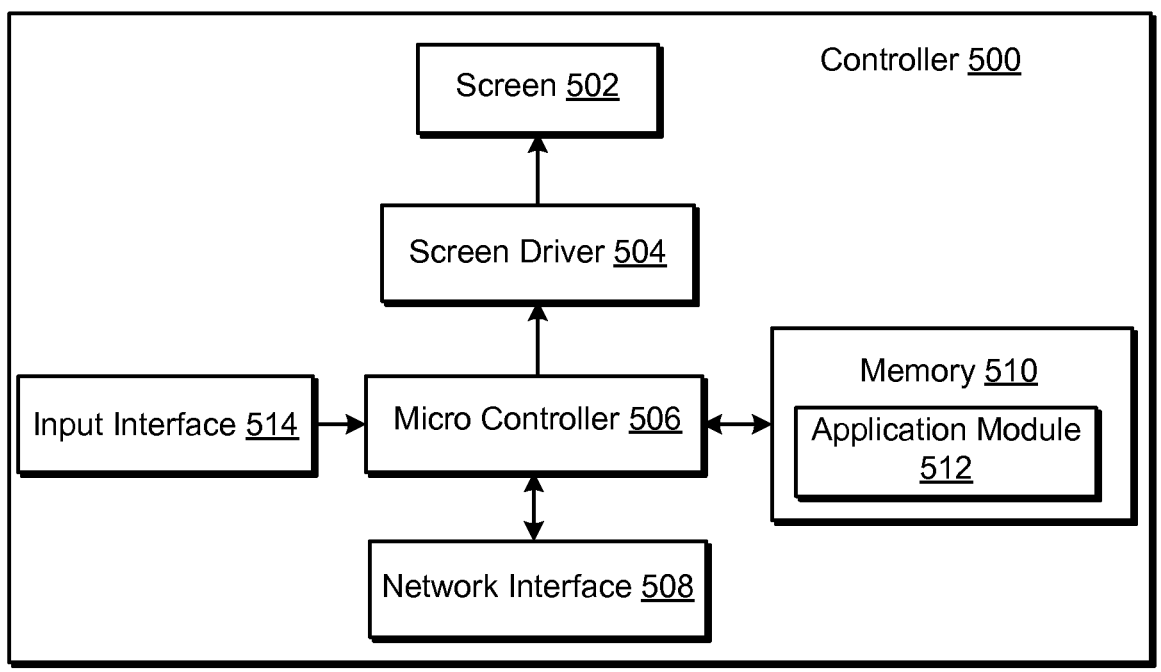
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Music Sharing and Playback Configuration

Certain embodiments enable a user to stream music from a music-playing application (e.g., browser-based application, native music player, other multimedia application, and so on) to a local multimedia content playback (e.g., Sonos™) system. Certain embodiments provide secure systems and methods for multimedia content playback across a plurality of systems and locations. Certain embodiments facilitate integration between content partners and a playback system as well as supporting maintenance of such content and system.

Figure 6:
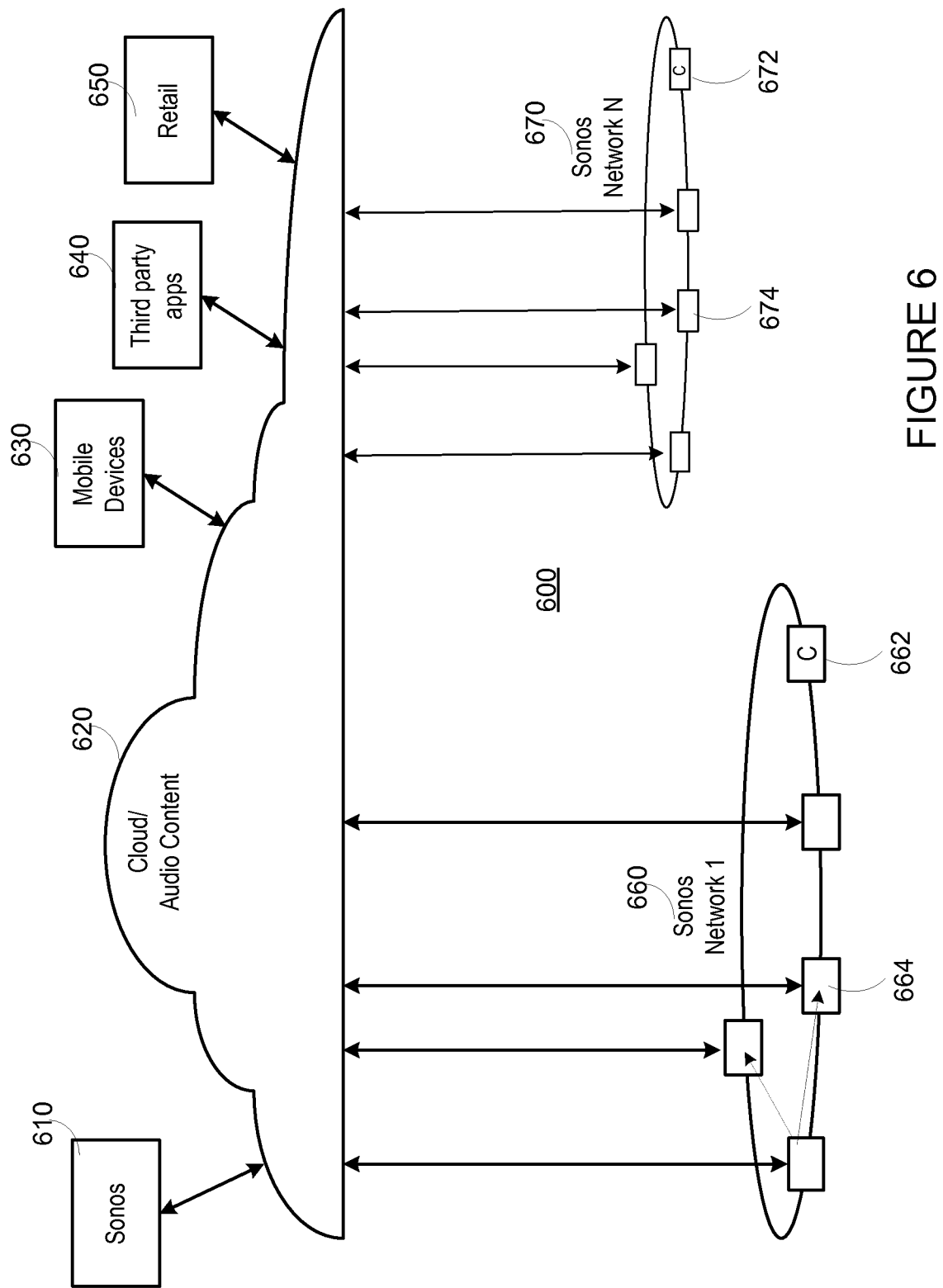
FIG. 6 shows an example system including a plurality of networks including a cloud-based network and at least one local playback network.

FIG. 6 shows a system including a plurality of networks including a cloud-based network and at least one local playback network. The network includes a plurality of playback devices or players, though it is understood that the network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 600 of FIG. 6, a plurality of content providers 620-650 can be connected to one or more local playback networks 660-670 via a cloud and/or other network 610. Using the cloud 610, a multimedia playback system 620 (e.g., Sonos™), a mobile device 630, a third party application 640, a retail location 650, and so on can provide multimedia content (requested or otherwise) to local playback networks 660, 670. Within each local network 660, 670, a controller 662, 672 and/or playback device 664, 674 can provide a song identifier, song name, playlist identifier, playlist name, genre, preference, and so on, and/or simply receive content from a connected system via the cloud.

VI. Example Menu and Track Selection System

Certain embodiments provide a user interface facilitating user selection of one or more items (e.g., audio and/or video tracks) for playback over a playback network (e.g., a home audio network). Using the example interface, a user can browse content, select one or more tracks (e.g., multiselect), queue tracks with respect to one or more playback devices (and/or groups of playback devices, also known as zone groups), delete tracks from a queue, and so on.

The example interface provides multi-selection of a browseable item (e.g., the interface allows both click to navigate into a container in a list of containers and click to multiselect those containers, without use of a tree view or similar "open/close" widget). Using multiselection, a list navigation paradigm can be maintained.

Using the example interface, a user can manipulate one or more queues through maneuvering of a cursor on the interface display. For example, a user can hover, click, and so on to perform single and/or multiple selection of displayed items (e.g., tracks). Via the interface, a user can drag and drop one or more items into one or more queues (e.g., one or more audio tracks into one or more zone queues).

In certain embodiments, movement of an item into a queue associated with one or more playback devices causes a file, link, or the like associated with the item to be transferred to one or more playback devices associated with the queue. The playback device(s) can then play back the associated item (e.g., audio content).

Figure 7:
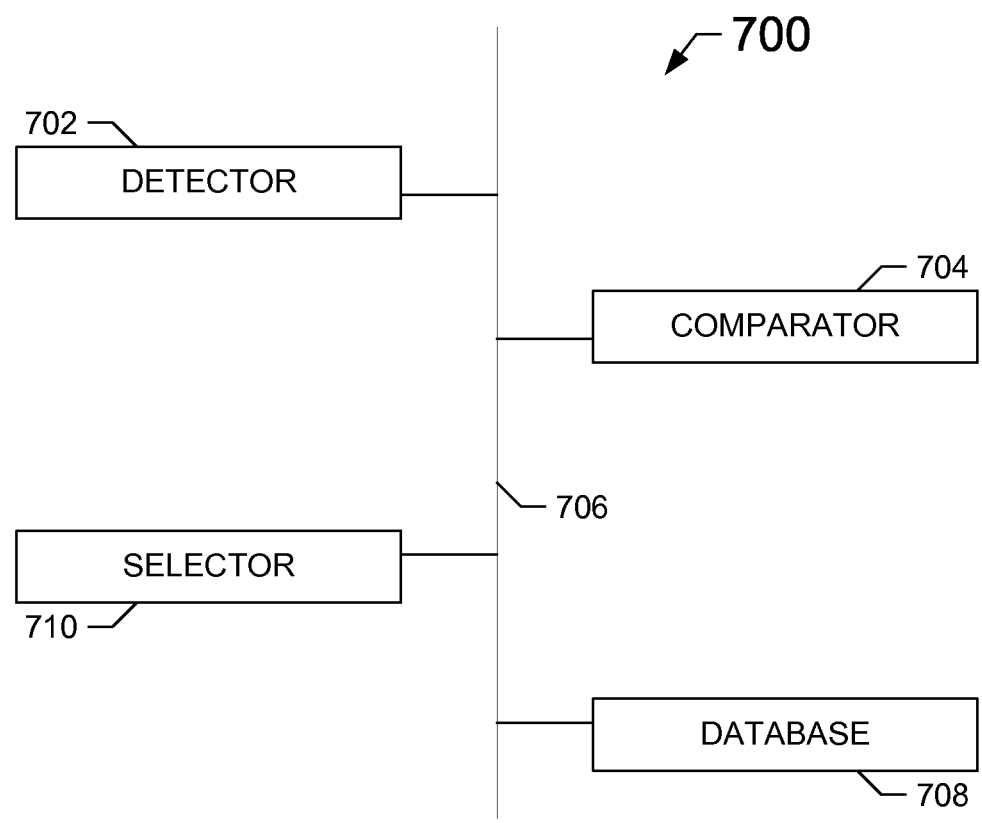
FIG. 7 shows an example functional block diagram of an audio source or track selection system.

Referring now to FIG. 7, there is shown an example functional block diagram of an audio source or track selection system 700 in accordance with an embodiment. The audio track selection system 700 may be used, for example, by a user operating any of the zone players 102-124 of FIG. 1.

The example system 700 includes a detector 702. The example detector 702 detects a cursor movement with respect to a graphical user interface, such as a user interface depicting one or more zones and available audio tracks for user selection. The detector 702 detects a cursor movement on a monitor or other display with respect to the interface.

The example system 700 also includes a comparator 704. The comparator 704 is communicatively coupled to the detector 702 and to other components of the example system 700 via communication links 706. The communication links 706 may be any type of wired (e.g., a databus, a USB connection, etc.) or wireless communication mechanism (e.g., radio frequency, infrared, etc.) using any past, present or future communication protocol (e.g., Bluetooth, USB 2.0, etc.). Also, the components of the example system 700 may be integrated in one device or distributed over two or more devices.

The example comparator 704 compares a cursor movement detected by the detector 702 to a current state of the user interface. The state information and content (e.g., audio track) information may be stored, for example, in a database 708. The database 708 may be, for example, any storage structure including, for example, a local storage memory such as, for example in any of the zone players 102-110 of FIG. 1 and/or the zone player 200 of FIG. 2A. Also, in some examples, the database 708 may be a network-based database such as, for example, a database accessible via the internet and/or a cloud.

The example audio track(s) are associated with related properties. The properties may include for example, the artist, genre, rhythm, tempo, past play history, popularity with each of a number of users, popularity with a demographic group, rating on a ranking chart (e.g., Billboard Top 40, Top 100, etc.), a characteristic to match a condition and/or any other suitable characteristic or metric.

In certain embodiments, track(s) are to be tagged with metadata related to the properties. The metadata may be provided by the distributor of the track including, for example, metadata related to the artist, album, genre, etc. In addition, metadata may be added by a user including, for example, an indication that the user likes a certain song, that the user likes a certain song at a certain time of day, likes a certain song while driving, likes to awake to a certain song, that a certain song reminds the user of a certain person or event. Users can tag a track with metadata related to any type of condition and such metadata becomes part of the property of the track. In certain embodiments, the metadata is tagged to a song automatically. All metadata and other properties may be stored with the tracks in the database 708.

In other examples, the user may establish an account or profile, such as a Sonos® profile or a profile with a free or subscription-based music and/or radio services including, for example, Pandora®, Spotify™, Rhapsody™, MOG, Napster™ and/or any other existing or future music service. The database 708 may store metadata in association with links and/or pointers to a music service, for example.

The example system 700 also includes a selector 710. The selector 710 selects an audio track for presentation to the user in response to output from the detector 702 and comparator 704. Based on cursor position and/or other cursor action (e.g., selection and so on), a user can select or multi-select item(s) available on the interface for queuing and/or immediate playback via one or more connected playback devices.

In some embodiments, the system 700 asks the user for his or her identity or for the identity of the person for whom the music for. In some examples, the system 700 can determine who the user is based on an operational history of the playback device. For example, if a user selects a specific genre, skips certain songs, repeats other songs, etc., the system 700 can deduce who is operating the playback device.

When the selector 710 selects one or more audio track(s) for presentation to the user, the system 700 automatically plays the track for the user or may automatically put the track into a playlist or queue for playback. The playlist may be updated over time, including, for example removing unplayed track(s). In addition, in some examples, the track(s) may be presented under a tab visible on a display of the playback device (e.g., the display 242 of FIG. 2B). In certain embodiments, the system 700 presents the user with a link to obtain the audio track (e.g., an unpurchased track).

In some examples, the playback device may have a "smart play" button (e.g., another purpose for the music button 248 of FIG. 2B) on the device itself that could activate a playback system and, thus, generate a track selection and/or a smart playlist for that room, zone, zones, etc. and/or for a particular time.

Figure 8:
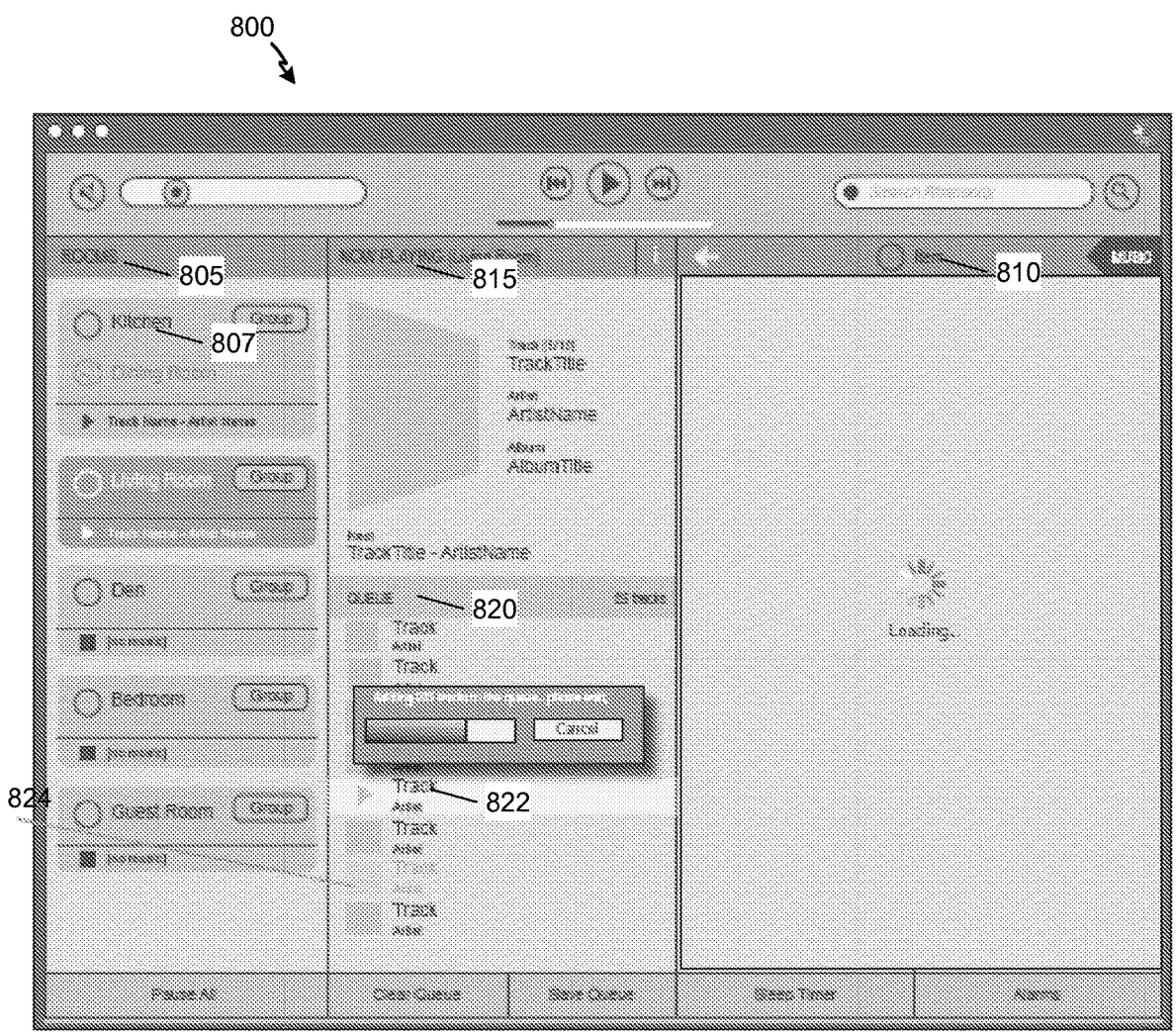
FIGS. 8-11 depict example controller user interfaces for a playback system.

FIG. 8 depicts an example controller user interface 800 for a playback system. Via the controller interface 800, a user may view and select one or more zones 805 and items 810, as well as content currently playing 815 and content in a queue 820 for playing next. For a given zone 807, the example interface 800 shows a zone and/or zone group name and a currently playing content (e.g., track) identifier, for example. The queue 820 includes one or more tracks 822 to be played. A deleted item 824 may be dimmed until the queue 820 is refreshed to remove the item 824, for example.

Figure 9:
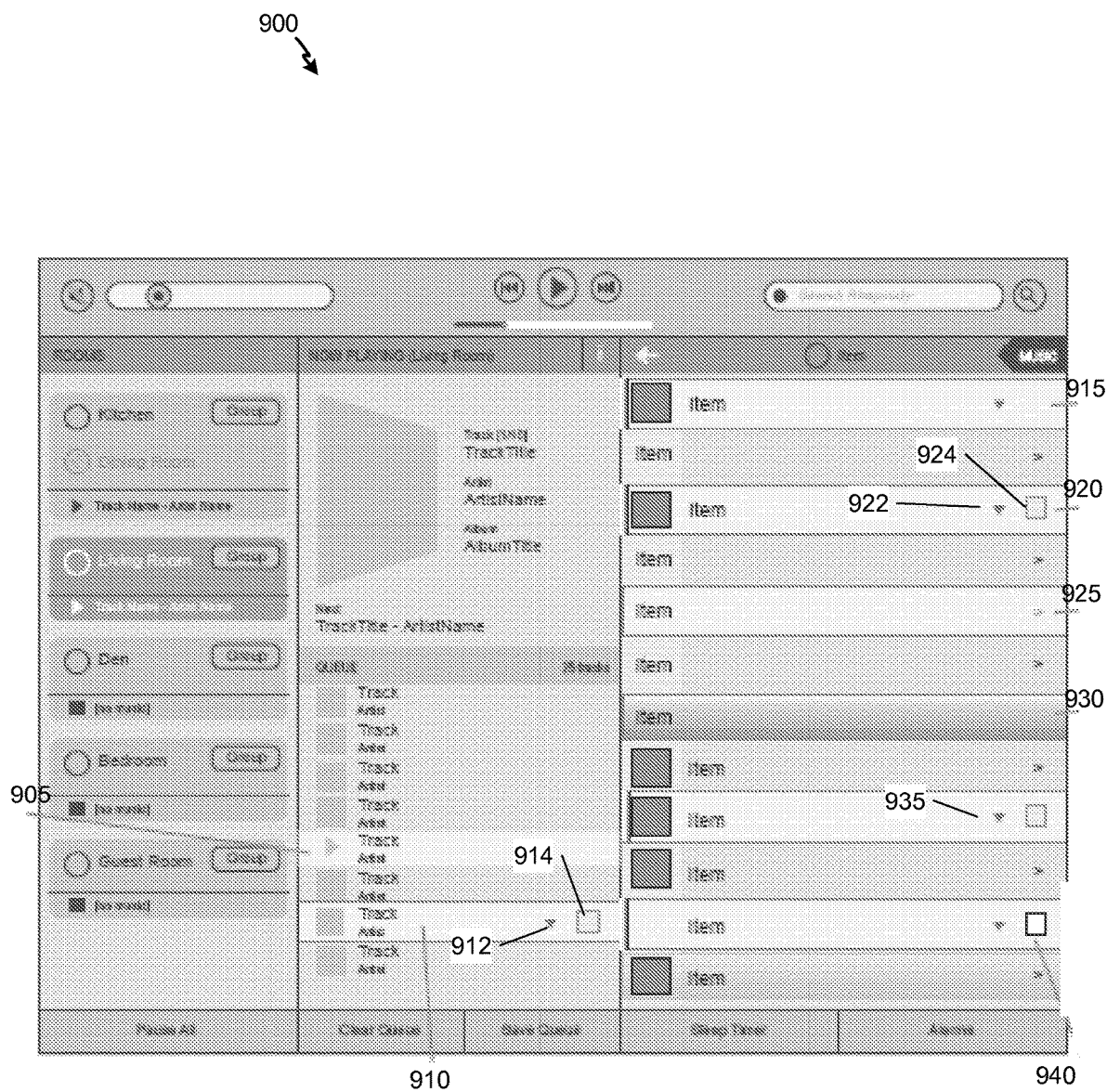

FIG. 9 illustrates an example controller interface 900 facilitating multi-select interaction with displayed content. A currently playing track 905 is shown in a queue for a selected zone. The track may be highlighted in the queue as currently playing. In certain examples, hovering over the currently playing track with the cursor will replace a play indicator with a pause button and/or otherwise adjust the information and/or functionality displayed in association with the track 905 in the queue.

In the example of FIG. 9, an item 910 in the queue that is not currently playing shows a dropdown icon 912 upon a hover of the cursor over the item 910. Selection of the dropdown icon 912 opens a play context menu. Selection of a checkbox 914 associated with the item 910 puts the item 910 into a multi-selected state and puts the interface 900 into a multiselect mode (if not already in multiselect mode). A click on the item 910 deselects current selection(s) and highlights the item 910, for example.

The example controller interface 900 of FIG. 9 illustrates several multi-select hover states and behaviors. For example, as shown with respect to item 915, a non multi-selectable, playable leaf node item 915 includes a dropdown icon. Double-clicking on the body of the item 915, or single clicking on the dropdown icon opens the play context menu, for example. For a multi-selectable, playable item 920 (e.g., container or leaf item), both a dropdown icon 922 and a checkbox 924 are provided in the example controller interface 900. Clicking on the dropdown icon 922 opens the play context menu. Single clicking on the body of the item 920 navigates a container or sets locate highlight to a leaf. On a leaf, double-clicking the body of the item 920 also executes a "Play Now" of the item (e.g., an audio track corresponding to the displayed item 920).

As shown with respect to item 925 on the interface 900, a non-multi-selectable, non-playable container 925 (e.g., a top level music menu item) shows a normal chevron without a dropdown icon or checkbox. Clicking on the body of the item 925 navigates to the content of the item 925.

Item 930 illustrates a non multi-selectable, non-playable leaf node (e.g., an infoview action node) which shows a button-like hover treatment. Clicking on the item 930 triggers performance of an associated action. An appearance of the selected item 930 may be "pressed in" or otherwise differentiated in appearance from other unselected items in the interface 900.

As shown in the example of FIG. 9, a click or other selection of a dropbox icon for item 935 opens a play context menu. With respect to item 940, selection of the item row body navigates if the item 940 is a container and deselects any multiselection if the item 940 is either a container or leaf node. Selection of the dropdown icon opens a dropdown menu. Selection of the checkbox checks the checkbox and puts the interface 900 pane into multiselect mode if it is not already in the multiselect mode.

Figure 10:
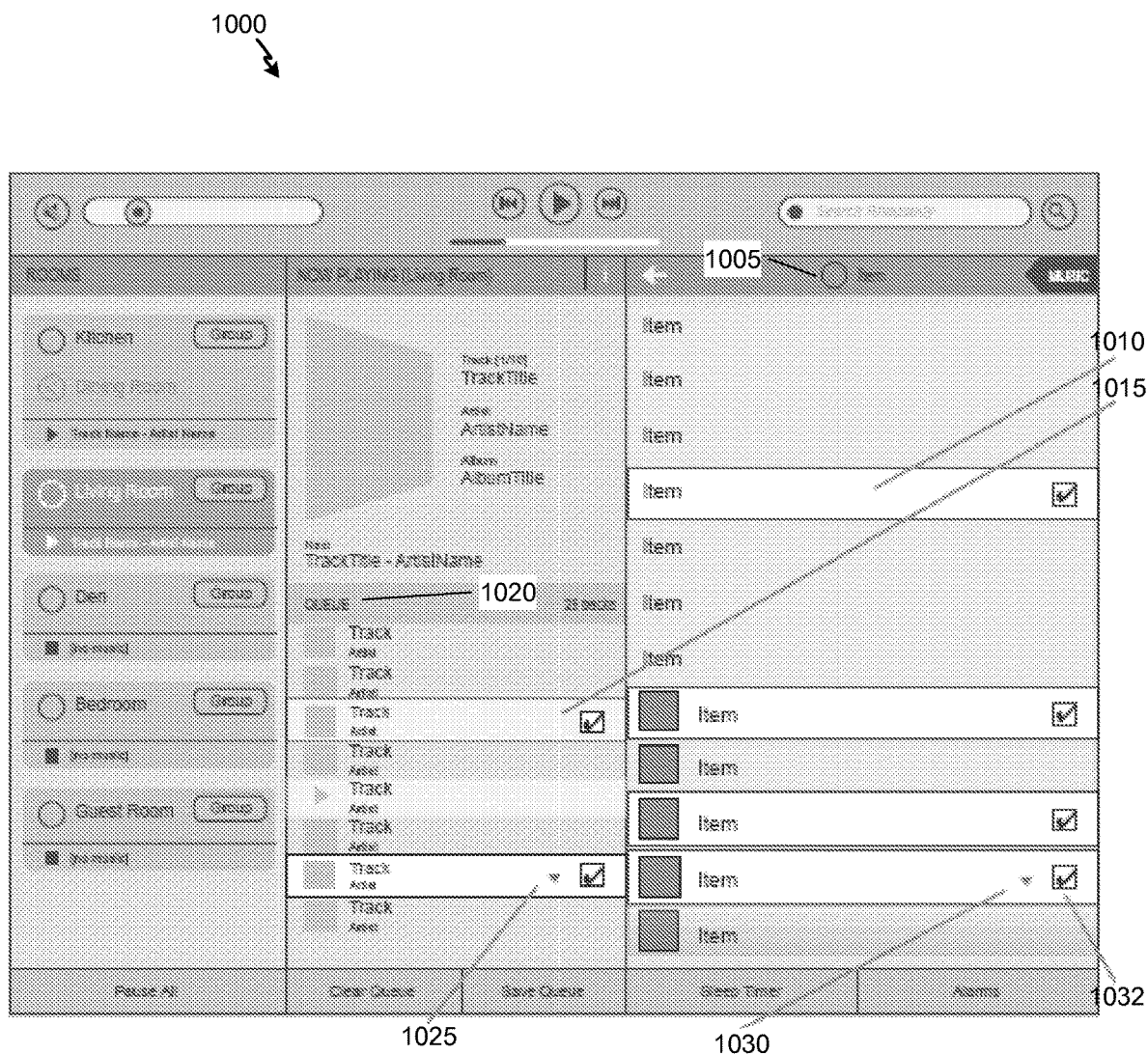

FIG. 10 illustrates an example controller interface pane 1000 showing example multi-select checked states and behaviors. As shown at item 1010, when a focus of the interface 1000 is in an items pane 1005, one or more selected items appear at full brightness. When focus is not in a pane, such as an item 1015 in a queue 1020, selected item(s) appear less bright. Via the controller interface 1000, a user can select one or more items as indicated by a checked checkbox in the example of FIG. 10. For example, items 1025 and 1030 depicted a checked or selected state for a checkbox widget. A selection of a dropdown icon 1027, 1032 opens a play context menu, for example.

Selection of a checkbox that has previously been selected unchecks the checkbox and takes the associated item into a multi-selected state. Selecting a location on an item other than a dropdown icon or checkbox unselects all and puts a location highlight on the selected item, for example. Dragging an item or selection to the queue 1020 deselects any current selections in the queue pane 1020. Selection(s) in the browse pane 1040 can be preserved after dragging and dropping an item from the browse pane 1040 to the queue 1020.

Figure 11:
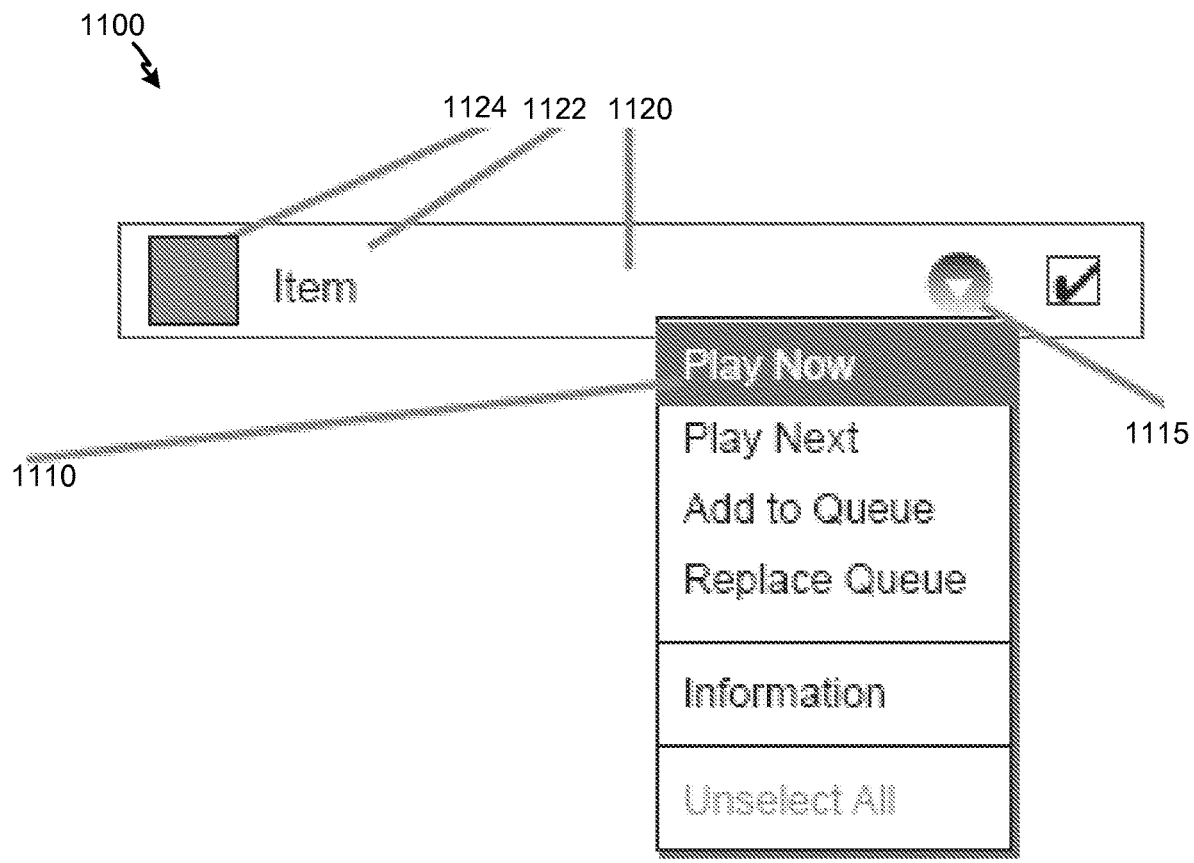
Figure 11:
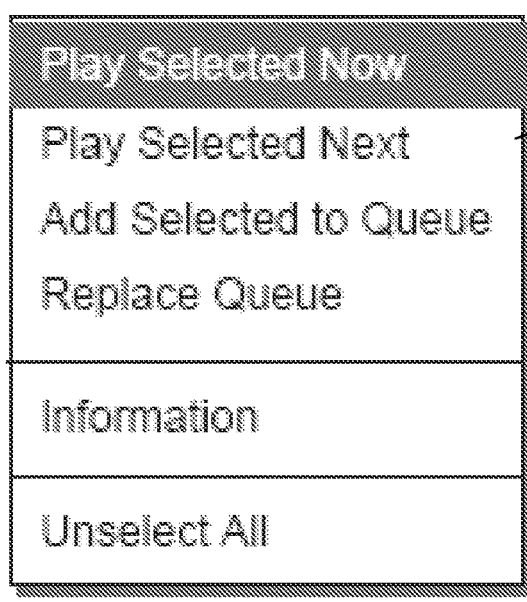

FIG. 11 illustrates an example context menu 1110 provided for an item 1120 in a controller interface 1100. The item 1120 may be displayed with an identifier 1122 (e.g., a name) and a status 1124 (e.g., selected, unselected, container, leaf, and so on), for example. Selecting the item 1120 triggers play of content associated with the item 1120 (e.g., an audio track) at one or more designated playback devices (e.g., a zone group). Hovering over the item 1120 highlights the item 1120, and selecting an indicator 1115 launches the context menu 1110. As shown in the example context menu 1110, a user can select to play content associated with the item 1120 now, play next, add to a queue, replace a queue, retrieve information regarding the content, and so on.

As shown in the example multiselection context menu 1130, if a plurality of items have been selected in multiselect mode, then the context menu 1130 allows a user to play selected now, play selected next, add selected to queue, retrieve information, unselect all, and so on for the selected set of item(s).

In certain examples, queue and browse pane context menus may switch location highlight when a context menu is invoked on a list item. If the context menu is on an existing multiselection, the selection is to be preserved. If the context menu is not on a selected item, any existing multiselection may be removed.

Thus, certain examples, as illustrated in FIGS. 8-11, provide an ability to manipulate a queue for content playback through hovering of a cursor over an item, clicking on or otherwise selecting the item, and multi-selection of a plurality of items. In certain examples, highlighting and/or other user interface appearance is maintained through multi-selection.

For example, a user can hover over an album displayed via a controller interface to display a dropdown arrow. Selection of the dropdown displays a context-sensitive menu of options for playback, queuing, selection, and so on. Selected item(s) can also be dragged and dropped into a queue for immediate or later playback, and additional actions can be taken with respect to the selected item(s) together. In certain examples, if an album is selected, actions taken with respect to the selected album are extended to each selected track in the album. Dragging one or more selected items into a queue, zone, zone group, and so on results in transfer of the content for playback to one or more associated playback devices. In multiselect mode, dragging one or more items into one zone also transfers the selected items into other selected zones, for example.

Figure 12:
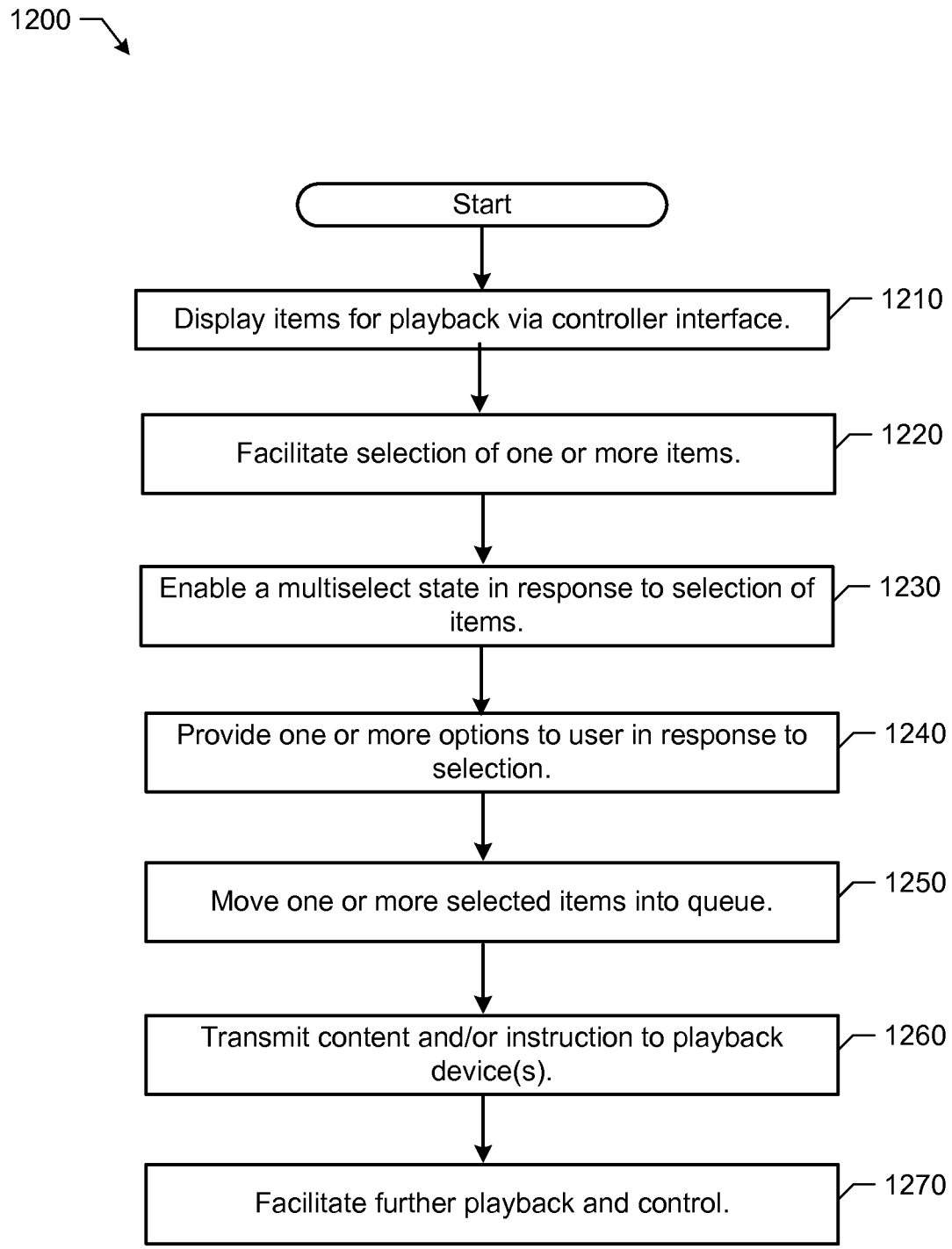
FIG. 12 illustrates a flow diagram for an example method of hierarchical navigation, action and multi-selection in a single list view.

FIG. 12 illustrates a flow diagram for an example method 1200 of hierarchical navigation, action and multi-selection in a single list view. At block 1210, items available for playback are displayed to a user via a controller interface. For example, a plurality of albums and/or other audio content sources (e.g., online streaming music services, individual audio files, and so on) are displayed via a Web-based controller interface along with one or more available zones and associated queues.

At block 1220, one or more items may be selected. Selection can occur via hovering over an item by positioning a cursor using a mouse or other cursor-positioning device (e.g., trackball, touch pad, touchscreen, and so on) with respect to an item on the interface, for example. Selection can occur by selecting an item via the interface (e.g., by click on a representation of an item), for example. Selection can occur by checking a box or selecting a menu dropdown on an item via the interface, for example.

At block 1230, a multiselect state or mode is enabled in response to selection of one or more items. In a multiselect mode, option(s) applied to one selected item also apply to other selected items.

At block 1240, one or more available options are provided to a user in response to the selection. Options may vary depending upon whether multiselect mode is or is not currently enabled. In multiselect mode, options selected with respect to one item may be applied to some or all selected items.

At block 1250, one or more selected items are moved into a queue. In certain examples, one or more selected items may be dragged and dropped from a browseable item list into a queue associated with one or more zones. In certain examples, dragging and dropping one item among multiple selected items into a queue results in all selected items being placed into the queue.

At block 1260, content and/or instructions associated with item(s) placed in a queue is transmitted to one or more playback devices. For example, content and/or instructions is transmitted to one or more playback devices associated with the queue for playback. Playback may be facilitated according to the selected option(s) and/or other configuration information (e.g., a scene, theme, zone group configuration, and so on). Content for playback may be provided via a link or pointer to the content (e.g., a link to a music streaming service, a pointer to a file location in memory, and so on), the content itself (e.g., an audio file for playback), and so on.

At block 1270, playback of content and further control of playback is facilitated via the controller interface. For example, a user may continue to change selected item(s), selected option(s), queued item(s), and grouped zone(s) via the controller interface.

While example manners of implementing the example systems to play, match and/or select audio track(s) have been illustrated in the accompanying Figures, one or more of the elements, processes and/or devices illustrated in the Figures may be combined, divided, re-arranged, omitted, eliminated and/or implemented in any other way. Further, the example examples illustrated in the Figures may be implemented by hardware, software, firmware and/or any combination of hardware, software and/or firmware. Thus, for example, the depicted elements may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example elements is hereby expressly defined to include hardware and/or a tangible computer readable medium such as a memory, DVD, CD, etc. storing the software and/or firmware. Further still, the example systems shown in the Figures may include one or more elements, processes and/or devices in addition to, or instead of, those illustrated in the accompanying Figures and/or may include more than one of any or all of the illustrated elements, processes and devices.

FIG. 12 is a flowchart representative of example machine readable instructions that may be executed to implement the example systems shown and described herein. In the example of FIG. 12, the machine readable instructions include a program for execution by a processor such as the processor 408 or micro controller 506. The program may be embodied in software stored on a tangible computer readable medium such as a CD-ROM, a floppy disk, a hard drive, a digital versatile disk (DVD), or a memory associated with a processor, but the entire program and/or parts thereof could alternatively be executed by a device other than the example processor 408/506 and/or embodied in firmware or dedicated hardware. Further, although the example program is described with reference to the flowchart illustrated in FIG. 12, many other methods of implementing the example systems may alternatively be used. For example, the order of execution of the blocks may be changed, and/or some of the blocks described may be changed, eliminated, or combined.

As mentioned above, the example processes of FIG. 12 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 12 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A method comprising:

displaying a first list of media items via a graphical user interface (GUI) of a controller device, wherein the first list of media items comprises (i) a plurality of multi-selectable media items, wherein each multi-selectable media item in the first list of media items is configurable into a multi-select state that enables application of one multi-select queue management action to every multi-selectable media item in the first list of media items that is in the multi-select state, and (ii) a plurality of non-multi-selectable container items;

after receiving an input via the GUI, putting a first multi-selectable media item of the plurality of multi-selectable media items into the multi-select state, wherein the first multi-selectable media item corresponds to first media content available from a first online streaming media service;

while the first multi-selectable media item is in the multi-select state, and after receiving a selection of a second multi-selectable media item via the GUI, putting the second multi-selectable media item into the multi-select state, wherein the second multi-selectable media item corresponds to second media content available from a second online streaming media service different than the first online streaming media service;

while the first multi-selectable media item and the second multi-selectable media item are in the multi-select state, displaying a menu via the GUI, wherein the menu comprises a plurality of multi-select queue management actions;

after receiving a selection of one multi-select queue management action from the plurality of multi-select queue management actions of the menu while the first multi-selectable media item and the second multi-selectable media item are in the multi-select state, performing the selected multi-select queue management action for both the first multi-selectable media item and the second multi-selectable media item; and after receiving a selection of a non-multi-selectable container item while the first multi-selectable media item and the second multi-selectable media item are in the multi-select state, deselecting, by the controller device, the first multi-selectable media item and the second multi-selectable media item, exiting, by the controller device, the multi-select state, and displaying, by the GUI of the controller device, previously undisplayed contents of the non-multi-selectable container item in the GUI.

2. The method of claim 1, wherein the one multi-select queue management action selected from the plurality of multi-select queue management actions is an add to queue action, and wherein performing the selected multi-select queue management action for both the first multi-selectable media item and the second multi-selectable media item includes adding both the first multi-selectable media item and the second multi-selectable media item to a playback queue for playback by one or more playback devices.

3. The method of claim 2, wherein adding both the first multi-selectable media item and the second multi-selectable media item to a playback queue for playback by one or more playback devices comprises causing at least one playback device of the one or more playback devices to add a link to the first multi-selectable media item and a link to the second multi-selectable media item to a queue stored on the at least one playback device of the one or more playback devices.

4. The method of claim 2, further comprising:
after adding both the first multi-selectable media item and the second multi-selectable media item to a playback queue for playback by one or more playback devices, displaying a graphical representation of the first multi-selectable media item and a graphical representation of the second multi-selectable media item in a second list that is different than the first list.

5. The method of claim 1, wherein the one multi-select queue management action selected from the plurality of multi-select queue management actions is a play now action.

6. The method of claim 1, wherein the one multi-select queue management action selected from the plurality of multi-select queue management actions is a replace queue action.

7. The method of claim 1, further comprising:
after receiving an input via the GUI to select a non-multi-selectable container item, displaying contents of the non-multi-selectable container item in the GUI.

8. Tangible, non-transitory computer-readable media comprising instructions stored therein, wherein the instructions, when executed cause a controller device to perform functions comprising:
displaying a first list of media items via a graphical user interface (GUI) of the controller device, wherein the first list of media items comprises (i) a plurality of multi-selectable media items, wherein each multi-selectable media item in the first list of media items is configurable into a multi-select state that enables application of one multi-select queue management action to every multi-selectable media item in the first list of media items that is in the multi-select state, and (ii) a plurality of non-multi-selectable container items;
after receiving an input via the GUI, putting a first multi-selectable media item of the plurality of multi-selectable media items into the multi-select state, wherein the first multi-selectable media item corresponds to first media content available from a first online streaming media service;
while the first multi-selectable media item is in the multi-select state, and after receiving a selection of a second multi-selectable media item via the GUI, putting the second multi-selectable media item into the multi-select state, wherein the second multi-selectable media item corresponds to second media content available from a second online streaming media service different than the first online streaming media service;
while the first multi-selectable media item and the second multi-selectable media item are in the multi-select state, displaying a menu via the GUI, wherein the menu comprises a plurality of multi-select queue management actions;
after receiving a selection of one multi-select queue management action from the plurality of multi-select queue management actions of the menu while the first multi-selectable media item and the second multi-selectable media item are in the multi-select state, performing the selected multi-select queue management action for both the first multi-selectable media item and the second multi-selectable media item; and
after receiving a selection of a non-multi-selectable container item while the first multi-selectable media item and the second multi-selectable media item are in the multi-select state, deselecting, by the controller device, the first multi-selectable media item and the second multi-selectable media item, exiting, by the controller device, the multi-select state, and displaying, by the GUI of the controller device, previously undisplayed contents of the non-multi-selectable container item in the GUI.

9. The tangible, non-transitory computer-readable media of claim 8, wherein the one multi-select queue management action selected from the plurality of multi-select queue management actions is an add to queue action, and wherein performing the selected multi-select queue management action for both the first multi-selectable media item and the second multi-selectable media item includes adding both the first multi-selectable media item and the second multi-selectable media item to a playback queue for playback by one or more playback devices.

10. The tangible, non-transitory computer-readable media of claim 9, wherein adding both the first multi-selectable media item and the second multi-selectable media item to a playback queue for playback by one or more playback devices comprises causing at least one playback device of the one or more playback devices to add a link to the first multi-selectable media item and a link to the second multi-selectable media item to a queue stored on the at least one playback device of the one or more playback devices.

11. The tangible, non-transitory computer-readable media of claim 9, wherein the functions further comprise:
after adding both the first multi-selectable media item and the second multi-selectable media item to a playback queue for playback by one or more playback devices, displaying a graphical representation of the first multi-selectable media item and a graphical representation of the second multi-selectable media item in a second list that is different than the first list.

12. The tangible, non-transitory computer-readable media of claim 8, wherein the one multi-select queue management action selected from the plurality of multi-select queue management actions is a play now action.

13. The tangible, non-transitory computer-readable media of claim 8, wherein the one multi-select queue management action selected from the plurality of multi-select queue management actions is a replace queue action.

14. The tangible, non-transitory computer-readable media of claim 8, wherein the functions further comprise:
after receiving an input via the GUI to select a non-multi-selectable container item, displaying contents of the non-multi-selectable container item in the GUI.

15. A controller device comprising:
one or more processors; and
tangible, non-transitory computer-readable media comprising program instructions executable by the one or more processors such that the controller device is configured to:
display a first list of media items via a graphical user interface (GUI) of the controller device, wherein the first list of media items comprises (i) a plurality of multi-selectable media items, wherein each multi-selectable media item in the first list of media items is configurable into a multi-select state that enables application of one multi-select queue management action to every multi-selectable media item in the first list of media items that is in the multi-select state, and (ii) a plurality of non-multi-selectable container items;
after receiving an input via the GUI, put a first multi-selectable media item of the plurality of multi-selectable media items into the multi-select state, wherein the first multi-selectable media item corresponds to first media content available from a first online streaming media service;
while the first multi-selectable media item is in the multi-select state, and after receiving a selection of a second multi-selectable media item via the GUI, put the second multi-selectable media item into the multi-select state, wherein the second multi-selectable media item corresponds to second media content available from a second online streaming media service different than the first online streaming media service;
while the first multi-selectable media item and the second multi-selectable media item are in the multi-select state, display a menu via the GUI, wherein the menu comprises a plurality of multi-select queue management actions;
after receiving a selection of one multi-select queue management action from the plurality of multi-select queue management actions of the menu while the first multi-selectable media item and the second multi-selectable media item are in the multi-select state, perform the selected multi-select queue management action for both the first multi-selectable media item and the second multi-selectable media item; and
after receiving a selection of a non-multi-selectable container item while the first multi-selectable media item and the second multi-selectable media item are in the multi-select state, deselecting, by the controller device, the first multi-selectable media item and the second multi-selectable media item, exiting, by the controller device, the multi-select state, and displaying, by the GUI of the controller device, previously undisplayed contents of the non-multi-selectable container item in the GUI.

16. The controller device of claim 15, wherein the one multi-select queue management action selected from the plurality of multi-select queue management actions is an add to queue action, and wherein the program instructions that are executable by the one or more processors such that the controller device is configured to perform the selected multi-select queue management action for both the first multi-selectable media item and the second multi-selectable media item comprises program instructions that are executable by the one or more processors such that the controller device is configured to add both the first multi-selectable media item and the second multi-selectable media item to a playback queue for playback by one or more playback devices.

17. The controller device of claim 16, wherein the program instructions that are executable by the one or more processors such that the controller device is configured to add both the first multi-selectable media item and the second multi-selectable media item to a playback queue for playback by one or more playback devices comprises program instructions that are executable by the one or more processors such that the controller device is configured to cause at least one playback device of the one or more playback devices to add a link to the first multi-selectable media item and a link to the second multi-selectable media item to a queue stored on the at least one playback device of the one or more playback devices.

18. The controller device of claim 16, wherein the tangible, non-transitory computer-readable media comprises further program instructions that are executable by the one or more processors such that the controller device is configured to:
after adding both the first multi-selectable media item and the second multi-selectable media item to a playback queue for playback by one or more playback devices, display a graphical representation of the first multi-selectable media item and a graphical representation of the second multi-selectable media item in a second list that is different than the first list.

19. The controller device of claim 15, wherein the one multi-select queue management action selected from the plurality of multi-select queue management actions is a play now action.

20. The controller device of claim 15, wherein the one multi-select queue management action selected from the plurality of multi-select queue management actions is a replace queue action.

* * * * *